Figure 1:
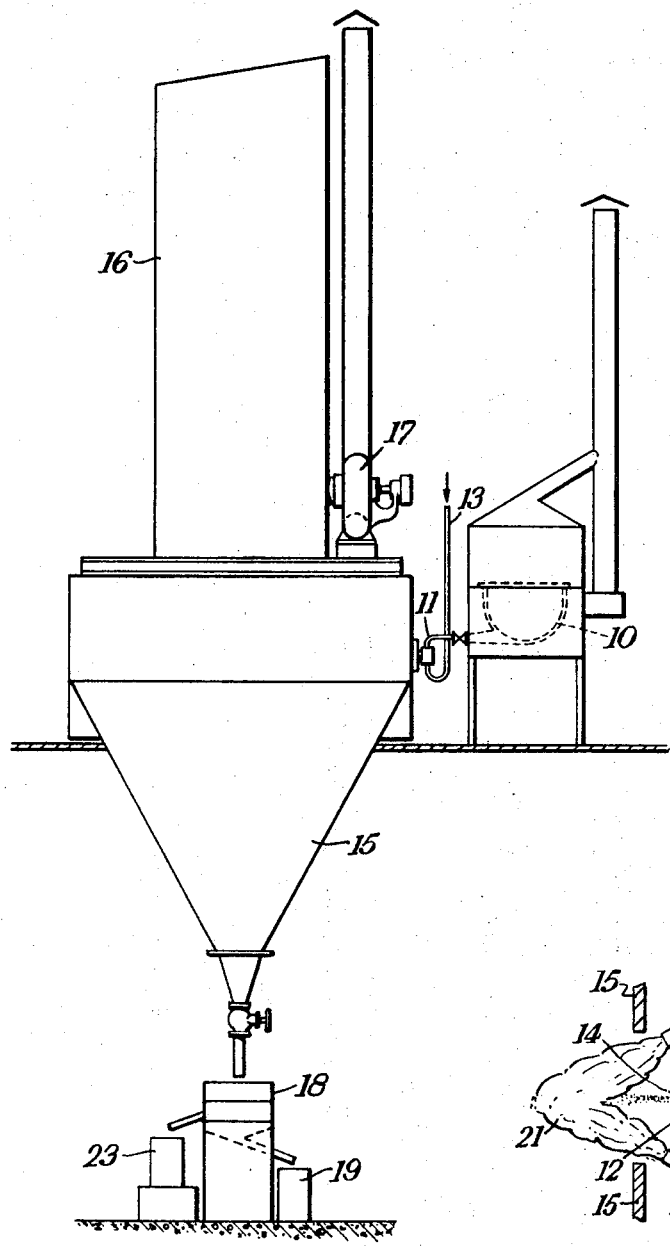

Oct. 10, 1967 — D. KINSELL — 3,346,677

MANUFACTURE OF POWDERED LEAD

Filed May 25, 1965

Inventor
David Kinsell
By Nolte + Nolte
Attorneys

United States Patent Office 3,346,677
Patented Oct. 10, 1967

3,346,677
MANUFACTURE OF POWDERED LEAD
David Kinsell, Ellesmere Port, England, assignor, by mesne assignments, to St. Joseph Lead Company, New York, N.Y., a corporation of New York
Filed May 25, 1965, Ser. No. 458,699
3 Claims. (Cl. 264—12)

Powdered lead may be manufactured by atomising a stream of molten lead by means of a jet of compressed air and it is often necessary from time to time to apply heat to the orifice from which the molten lead emerges in order to prevent freezing of the lead and blocking of the orifice as the result of the cooling effect of the expansion of the compressed air. Lead powder manufactured in this way ordinarily contains 1–1¼% by weight of lead oxide, estimated as PbO, and dispersion strengthened lead fabricated from each powder has an ultimate tensile strength of the order of 4000 lbs./sq. in. If precautions are not taken in storage of such lead powder, its content of lead oxide may rise to 2% or more. While this may lead to some increase in the tensile strength of dispersion strengthened lead fabricated from it, the increase in content of lead oxide in the stored powder is unpredictable and uncontrolled and the lead oxide is usually unevenly distributed so that the dispersion strengthened lead made from such powder does not have the full tensile strength to be expected from powder of that increased oxide content because the whole of the oxide is not usefully employed. Moreover, other disadvantages may arise from the uneven oxide distribution, such as reduced corrosion resistance.

One object of the present invention is to provide a convenient and economical method of making lead powder having an increased content of lead oxide. A further object is to ensure that the lead oxide is distributed through the mass of the powder in such a way as to enable it to exert an optimum effect in strengthening lead fabricated from it.

The invention provides a method for the manufacture of powdered lead which consists in supplying compressed air to an annular orifice surrounding a jet through which molten lead emerges as a stream and is conveyed by the air in atomised form to a collecting chamber and subjecting the stream of particles of molten lead to heat to delay the freezing of the particles and thereby increase the content of lead oxide in the lead powder. Preferably the stream of particles is subjected to a flame.

To obtain a powder which, for a given content of lead oxide, will yield dispersion strengthened lead of maximum tensile strength it is necessary that the lead oxide should be present throughout the mass of powder as a coating of minute particles of lead oxide on the individual particles of lead in as uniform a state of subdivision as possible. If any substantial number of lead particles become completely oxidized, the corresponding portion of the lead oxide content of the powder will be present in the mass of powder as discrete particles of oxide which provide little, if any, contribution to the strength of lead fabricated from the powder and, indeed, may render the lead liable to corrosion under stress.

In the absence of applied heat, the particles of lead in the stream emerging from the orifice will freeze to the solid state after having travelled only a short distance from the orifice as they are subjected to cooling by the compressed air, thereby limiting the extent of oxide formation. By subjecting the stream to the action of heat, freezing of the particle of lead is delayed and the lead oxide content of the powder is increased.

By using a flame which strongly heats the lead particles, e.g. to 900° C., it is possible to increase very considerably the lead oxide content of the powder, but when the lead is heated to so high a temperature complete conversion of many of the particles to oxide is likely to occur, with the result that the full benefit of the increased oxide content is not achieved.

Best results are achieved by using a flame which maintains the lead particles at a temperature only slightly above the melting point of lead, e.g. at 400° C., during passage through the flame. Under these conditions, the whole or substantially the whole of the oxide is obtained as a coating on individual lead particles and I have successfully made the lead powder containing 2–2½% of lead oxide and which, on extrusion, yielded lead having a tensile strength as high as 5000 lbs./sq. in.

When the method is carried out in this way, it is possible to obtain lead powder having a predictable content of lead oxide, substantially all of which is present in a condition in which it can contribute to the dispersion strengthing of lead. Predictable results are therefore obtainable in terms of the tensile strength of the lead, provided that the powder is properly stored under conditions which will inhibit further oxidation.

The invention accordingly includes lead powder, which has been manufactured by entraining molten lead in a jet of compressed air and subjecting the resulting stream of molten particles of lead to the action of heat, the lead powder containing lead oxide, substantially all of which is present as a coating of extremely fine particles on coarser particles of lead which have not been completely converted into lead oxide.

I have found that, to ensure that the lead oxide is present to an optimum extent in a usefully distributed form, it is desirable to utilize a lambent or reducing flame. Such a flame can be produced by burning town or other suitable gas under appropriate conditions. When gas burners are used under such conditions, a lambent gas flame issuing from the burners is entrained by the air stream emerging from the annular orifice and surrounds the stream of lead as an annular sheath which extends into the collecting chamber. The lead powder collected in the collecting chamber has a substantially uniform content of lead oxide which I believe to be capable of control by adjusting the burner so as to vary the amount of heat supplied to the powder by the flame.

The lead supplied to the orifice may be chemically pure lead or may contain a small proportion of alloying elements, e.g. antimony in an amount of up to 1%.

Figure 2:
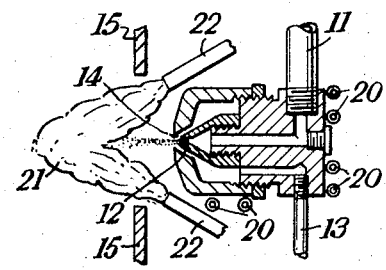

The invention will now be further explained with reference to the accompanying diagrammatic drawing in which:

FIG. 1 is a side elevation of the apparatus used and
FIG. 2 is a section, on a larger scale, through the nozzle.

The apparatus includes a lead melting pot 10, from which molten lead is supplied by gravity through a pipe 11 to a nozzle 12. Compressed air is supplied through a pipe 13 and emerges through an annular orifice 14 surrounding the nozzle 12. The powdered lead collects in a collecting chamber 15 fitted with bag house 16 and suction fan 17, entering the collecting chamber through a hole, which may have a diameter of 6 inches, situated opposite the nozzle 12. Beneath the chamber 15 is a sifter unit 18, constituted by a mechanically vibrated sieve, which delivers the product to a container 19 and rejects coarser material to a container 23. Electrical heater elements 20 serve to prevent solidification of lead in the nozzle.

Lambent gas flames 21 are directed from two burners 22 on to the material emerging from the nozzle.

Under the following operating conditions I have found that it is possible to produce lead powder having a content of lead oxide of 2.1% substantially all of which is present as surface particles upon particles of lead which have not been completely converted into oxide. This has been determined by microscopic examination of sections cut from lead produced by extrusion from the lead powder after storage under conditions precluding oxidation of the powder. The tensile strength of the extruded lead was found to be 5000 lbs./sq. in.

| | |
|---|---|
| Lead temperature in the melting pot, ° C. | 350–400 |
| Temperature in the collecting chamber, ° C. | 95 |
| Air temperature before emerging from the jet, ° C. | 200 |
| Air pressure, lbs./sq. in. | 65 |
| Air volume, cubic ft. per minute | 100 |
| Gas volume, cubic ft. per minute | 6 |
| Lead feed rate, cwts. per hour | 1½ |

The following is an analysis of the particle size of a typical batch of powdered lead collected in the receiving chamber:

| Microns, up to: | Percent by weight |
|---|---|
| 10 | 18 |
| 20 | 41 |
| 30 | 62 |
| 40 | 75 |
| 50 | 85 |
| 60 | 92 |
| 80 | 95 |
| 90 | 97 |
| 100 | 99 |

The theoretical size of the holes in a 300 mesh sieve corresponds to a particle size of 53 microns.

While I have referred above to heating the stream lead particles by flames from two burners, other suitable sources of heat may be used, for example suitably positioned infra red heaters.

What I claim as my invention and desire to secure by Letters Patent is:

1. A method for the manufacture of lead powder which consists in supplying compressed air to an annular orifice surrounding a jet through which molten lead emerges as a stream and is conveyed by the air in atomised form to a collecting chamber and subjecting the stream of particles of molten lead to a flame which heats the particles of lead in the stream to a temperature not substantially exceeding 400° C. and thereby delays freezing of the particles on their way to the collecting chamber.

2. A method for the manufacture of lead powder which consists of supplying compressed air to an annular orifice surrounding a jet through which molten lead emerges as a stream and is conveyed by the air in atomised form to a collecting chamber and subjecting the stream of particles of molten lead, after emergence from the jet and during travel to the collecting chamber, to a flame to delay freezing of the particles and increase the content of lead oxide, said flame providing sufficient heat to maintain the particles of molten lead in the stream at a temperature from about 400° C. to about 900° C.

3. The method of claim 2 in which the flame is a lambent flame.

References Cited

UNITED STATES PATENTS 1,856,679   5/1932   Williams et al.

ROBERT F. WHITE, *Primary Examiner.*

J. R. HALL, *Assistant Examiner.*